United States Patent [19]

Aoyama

[11] Patent Number: 5,372,279
[45] Date of Patent: Dec. 13, 1994

[54] PARTS-SUPPLY CONTROL APPARATUS

[76] Inventor: Yoshitaka Aoyama, 20-11, Makitsukadai 2-cho, Sakai-shi, Osaka 590-01, Japan

[21] Appl. No.: 39,434

[22] PCT Filed: Sep. 10, 1992

[86] PCT No.: PCT/JP92/01162
§ 371 Date: Apr. 20, 1993
§ 102(e) Date: Apr. 20, 1993

[87] PCT Pub. No.: WO93/06030
PCT Pub. Date: Jan. 4, 1993

[30] Foreign Application Priority Data

Sep. 14, 1991 [JP] Japan .................................. 3-310282

[51] Int. Cl.$^5$ .................................................. B65G 59/00
[52] U.S. Cl. ........................................ 221/251; 470/167
[58] Field of Search ............... 221/251, 22, 23, 268, 221/212, 294, 289; 470/167, 165

[56] References Cited

U.S. PATENT DOCUMENTS

| | | | |
|---|---|---|---|
| 3,900,132 | 8/1975 | Kuehn et al. | 221/251 |
| 4,228,901 | 10/1980 | Watzka et al. | 221/251 |
| 5,035,039 | 7/1991 | Aoyama | 29/495 |

*Primary Examiner*—Kenneth W. Noland
*Attorney, Agent, or Firm*—Pollock Vande Sande & Priddy

[57] ABSTRACT

A part-supply apparatus provisionally holds each part delivered from a parts-passage in a temporary holding chamber having an outlet aperture before delivering the released parts to a predetermined point from the outlet aperture by means of forward movement of a supply rod capable of moving itself back and forth; wherein, in order to prevent the second parts from coming into abnormal engagement with the preceding parts at the predetermined position in the tempoary holding chamber otherwise resulting in the inability to execute normal supply of parts, a constraining device for constraining transfer of the following parts is provided in the parts-passage immediately before the outlet aperture.

5 Claims, 3 Drawing Sheets

PARTS-SUPPLY CONTROL APPARATUS

FIELD OF THE INVENTION

The present invention relates to a parts-supply control apparatus which is available for such a field that provisionally holds each part in a temporary holding chamber having an outlet aperture before externally delivering them by means of a supply rod.

BACKGROUND ART

Referring now to FIGS. 4 through 7, a conventional art is described below. As shown in FIGS. 6 and 7, such parts being dealt by any of parts-supply control apparatuses substantially comprise projection nuts. FIG. 6 illustrates a circular nut, where the reference numeral 1 designates the whole aspect of a circular nut which comprises a main body 2, a tapped hole 3, a flange 4, and a plurality of projections 5 which are formed below the flange 4 and available for fusion. FIG. 4 illustrates a conventional apparatus which deals with such circular nuts shown in FIG. 6 for example. A parts-supply tube 7 having rectangular section and forming a parts-passage 6 and a guide tube 9 of a supply rod 8 are welded together in the orthogonal state. A temporary holding chamber 10 is disposed in the orthogonal domain. An end of the parts-supply tube 7 has such a shape as shown in FIG. 5. Concretely, plates above and below the parts-supply tube 7 are eliminated, whereas a pair of projective pieces 11 and 11 are formed on both sides, and yet, a stopper plate 12 is secured to the front edge of these projective pieces 11 and 11. Therefore, an outlet aperture 13 is formed as shown in FIG. 4. A magnet (a permanent magnet) 14 is secured to the stopper plate 12, where the magnet 14 attracts the nut 1 close to the left end of the parts-passage 6 so that it can be placed in the temporary holding chamber 10, where the nut 1 is provisionally held in the state coaxial with the supply rod 8 as shown in FIG. 4.

The supply rod 8 comprises a large-diametric domain 15 and a guide member 16 having diameter less than that of the large-diametric domain 15. An extrusive surface 17 is formed at the interface of both domains.

FIG. 4 illustrates a nut 1 which is obliquely placed in the parts-passage 6. Assuming that the obliquely placed nut 1 is not present in the parts-passage 6, operation of the above conventional apparatus is described below. When the supply rod 8 is driven forward by a pneumatic cylinder (not shown), the guide member 16 penetrates the tapped hole 3 to cause the extrusive surface 17 to hit against the top surface of the nut 1 before extruding the nut 1 by overcoming the attractive force of the magnet 14. The extruding velocity is predetermined to be faster than the falling velocity of the nut 1 itself.

Nevertheless, whenever operating the above conventional apparatus, as shown in FIG. 4, since the second nut projects itself out of the outlet aperture 13, the flange of the second nut comes into engagement with the preceding nut in the temporary holding chamber 10 in the state obliquely being held below the flange of the preceding nut. In consequence, when the supply rod 8 thrusts itself, the nut in the temporary holding chamber 10 is locked to obstruct execution of smooth delivery of the preceding nut. The same problem also occurs whenever dealing with a square projection nut having four fusible projections in four corners as shown in FIG. 7. The same problem also occurs even when dealing with flatly shaped parts.

DISCLOSURE OF THE INVENTION

Therefore, the invention has been provided in order to solve the above problem. The invention is characterized by provision of a constraining means for constraining movement of parts held in a parts-passage at a position immediately before an outlet aperture of this passage before externally delivering each part from the outlet aperture by means of a supply rod. Owing to the retention of each part, the apparatus prevents the second parts from interfering with the first parts by way of projecting itself from the outlet aperture.

According to the invention, since individual parts are constrained from moving themselves through a parts-passage immediately before the outlet aperture, there is no probability of causing the first and second parts to come into engagement with each other in such an abnormal state mentioned earlier, and therefore, the apparatus can implement highly reliable and smooth supply of parts.

OPTIMAL FORM FOR EMBODYING THE INVENTION

Figure 1:
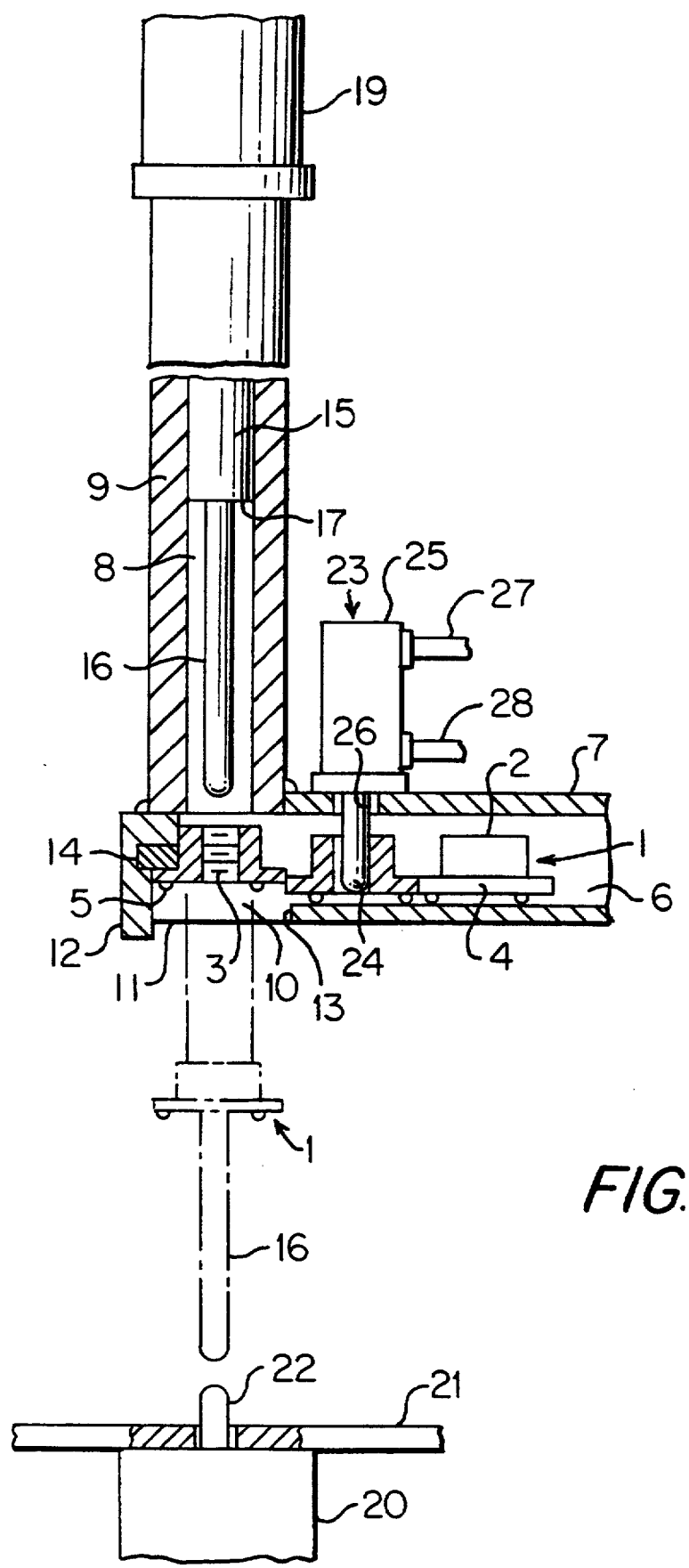
FIG. 1 is a vertical sectional lateral view designating the whole view of the apparatus related to the invention.

Structures identical to those which are explained in reference to FIGS. 4 through 7 are designated by identical reference numerals in the accompanying drawings, and thus, detailed description of these are deleted from the following description.

First, an embodiment of the invention shown in FIG. 1 is described below. A pneumatic cylinder 19 is linked with the top end of a guide tube 9. The piston rod of the pneumatic cylinder 19 makes up a large-diametrical domain 15 and drives a supply rod 8 in the forward and backward directions. Nut 1 is delivered to a steel-plate parts 21 which is placed on a stationary electrode 20, where a guide pin 22 of the stationary electrode is arranged to coincide with the nut 1 by way of penetrating the steel-plate parts 21. Two-dot chained lines respectively designate the state in which the thrusted supply rod 8 executes supply of nuts.

In order to constrain transfer of the nut 1 immediately before an outlet aperture 13 in a parts-passage 6, a constraining means 23 is provided. A variety of systems may be taken into consideration to materialize this constraining means 23. However, the invention introduces a system which causes a constraining pin 24 to thrust through a tapped hole 3 of the nut. Concretely, a pneumatic cylinder 25 is secured to the top surface of a parts-supply tube 7, where the piston rod of this pneumatic cylinder 25 makes up a constraining pin 24. The constraining pin 24 thrusts and retreats itself into and out of the parts-supply tube 7 via a through-hole 26 which penetrates the parts-supply tube 7. The reference numerals 27 and 28 respectively designate air-supply tubes for supplying air to the pneumatic cylinder 25.

When the first nut is positioned in a temporary holding chamber 10 and then the second nut just arrives at a position right below the constraining pin 24 which is in the retreating condition, the constraining pin 24 thrusts into the tapped hole 3 to prevent the second nut from transferring itself.

Figure 2:
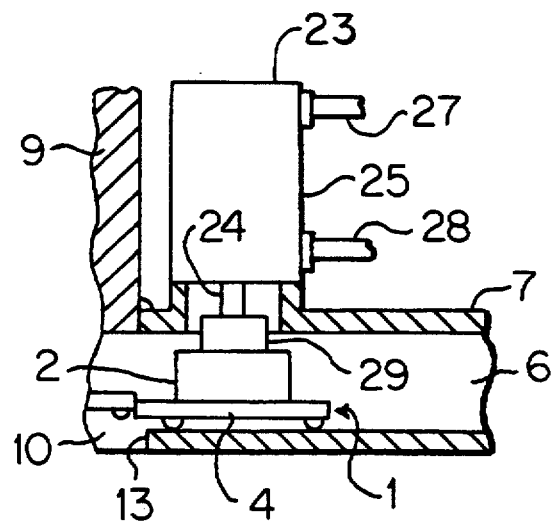
FIG. 2 and 3 are respectively vertical sectional partial lateral views designating other embodiments of the invention.

Next, another embodiment shown in FIG. 2 is described below. This embodiment introduces a system which presses the second nut against the inner surface of the parts-supply tube 7. A pressing piece 29 is combined with the piston rod of the pneumatic cylinder 25.

In the course of operating the pressing system shown in FIG. 2, while the nut 1 has not yet arrived at the inner surface of the parts-supply tube 7, transferring amount of the pressing piece 29 increases. The system confirms the presence or absence of the nut 1 by way of detecting the increase of the transferring amount of the pressing piece 29. In consequence, the system can prevent abnormal operation from occurrence. In addition to the method of depressing the nut 1 from the top, the nut 1 may also be pressed from a lateral side.

Figure 3:
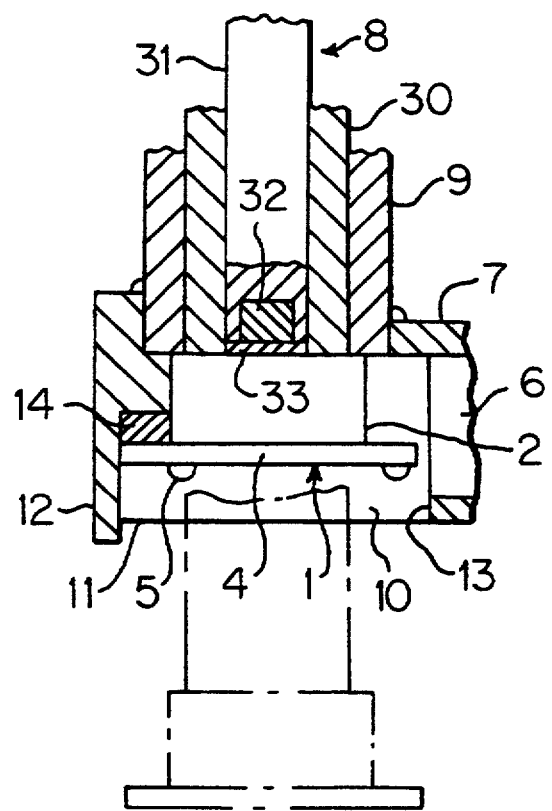
Figure 4:
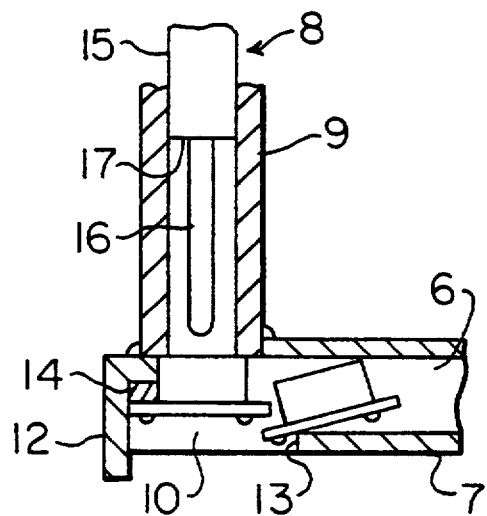
FIG. 4 is a vertical sectional lateral view of a conventional parts-supply control apparatus.
Figure 5:
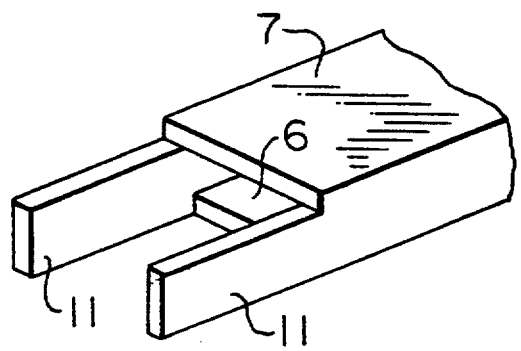
FIG. 5 is a cubical view designating the tip domain of the parts-supply tube.
Figure 6:
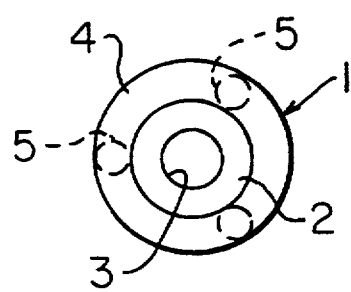
FIG. 6 is a plan of a circular nut.
Figure 7:
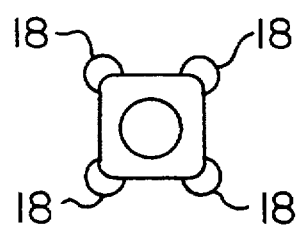
FIG. 7 is a plan of a square nut.

Another embodiment of the invention shown in FIG. 3 is described below. This embodiment provides a varied example of a double-structured supply rod 8 provided inside of a guide tube 9. Concretely, the supply rod 8 comprises a hollow shaft 30 and an inner shaft 31 which is slidably inserted in this hollow shaft 30. A magnet (a permanent magnet) is built in the tip domain of the inner shaft 31 and covered with a covering plate 33. When the standby mode shown in FIG. 3 is underway, bottom ends of both shafts 30 and 31 make up a single plane that can tightly be adhered to the top surface of the nut 1.

As soon as the nut 1 arrives at the predetermined position after causing the supply rod 8 to thrust itself in the state shown in FIG. 3, the supply rod 8 halts its own movement. In succession, only the inner shaft 31 is forcibly drawn back to cause the magnet 32 to leave the nut 1. As a result, the nut 1 falls onto the opposite member, thus completing supply of an individual parts. Since the mechanism for forcibly drawing only the inner shaft 31 backward can easily be implemented by applying any conventional method, further description of this mechanism is deleted here.

What is claimed is:

1. A parts supply apparatus comprising:
   a parts supply tube for housing a plurality of centrally bored fasteners moving through the tube for displacement to an outlet aperture;
   selectively actuatable constraining means mounted to the tube, the constraining means having a reciprocating actuator that passes through the tube for engaging a first fastener located immediately adjacent the outlet aperture, thereby constraining the first fastener's motion for a preselected interval;
   a holding chamber located inwardly of the outlet aperture for temporarily retaining a second fastener therein;
   a reciprocating guide rod axially aligned with the bore of the retained second fastener for passing through the bore of the second fastener and displacing the second fastener from the holding chamber and through the outlet aperture, to a delivery point.

2. The apparatus as set forth in claim 1 wherein the reciprocating actuator further comprises a pin having a diameter less than the bore diameter of the first fastener, the pin passing through the bore thereby constraining movement of the first fastener.

3. The apparatus as set forth in claim 1 wherein the reciprocating actuator further comprises a pin terminating outwardly in a pad for frictionally engaging a surface of the first fastener, thereby constraining movement thereof.

4. A parts supply apparatus comprising:
   a parts supply tube for housing a plurality of centrally bored threaded fasteners moving through the tube for displacement to an outlet aperture;
   a selectively actuatable pneumatic cylinder mounted to the tube and having a reciprocating actuator pin that passes through the tube, the actuator pin terminating outwardly in a pad for frictionally engaging a surface of a first fastener located immediately adjacent the outlet aperture, thereby constraining its motion for a preselected interval;
   a holding chamber located inwardly of the outlet aperture for temporarily retaining a second fastener therein;
   a reciprocating guide rod axially aligned with the bore of the retained second fastener for passing through the bore of the second fastener and displacing the second fastener from the holding chamber and through the outlet aperture, to a delivery point.

5. A parts supply apparatus comprising:
   a parts supply tube for housing a plurality of centrally bored threaded fasteners moving through the tube for displacement to an outlet aperture;
   a selectively actuatable pneumatic cylinder mounted to the tube and having a reciprocating actuator pin that passes through the tube for engaging the threaded bore of a first fastener located immediately adjacent the outlet aperture, thereby constraining its motion for a preselected interval;
   a holding chamber located inwardly of the outlet aperture for temporarily retaining a second fastener therein;
   a reciprocating guide rod axially aligned with the bore of the retained second fastener for passing through the bore of the second fastener and displacing the second fastener from the holding chamber and through the outlet aperture, to a delivery point.

* * * * *